US010829180B2

(12) United States Patent
Sakai et al.

(10) Patent No.: US 10,829,180 B2
(45) Date of Patent: Nov. 10, 2020

(54) HYDRAULIC OPERATING DEVICE

(71) Applicant: SHIMANO INC., Sakai (JP)

(72) Inventors: Takuma Sakai, Sakai (JP); Yasuyuki Komada, Sakai (JP); Mototsugu Nakai, Sakai (JP); Masahiro Nakakura, Sakai (JP); Takafumi Nishino, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 15/688,786

(22) Filed: Aug. 28, 2017

(65) Prior Publication Data
US 2019/0061870 A1 Feb. 28, 2019

(51) Int. Cl.
*B62L 3/02* (2006.01)
*B60T 11/16* (2006.01)
*B60T 7/10* (2006.01)
*B60T 11/10* (2006.01)
*B60T 11/18* (2006.01)

(52) U.S. Cl.
CPC ............ *B62L 3/023* (2013.01); *B60T 7/102* (2013.01); *B60T 11/102* (2013.01); *B60T 11/16* (2013.01); *B60T 11/18* (2013.01)

(58) Field of Classification Search
CPC .... B62L 1/00; B62L 1/005; B62L 1/10; B62L 1/12; B62L 1/14; B62L 3/00; B62L 3/02; B62L 3/023; B60T 7/102; B60T 11/046; B60T 11/22; F16D 55/228; Y10T 74/20287; Y10T 74/20438; Y10T 74/20624

USPC ............ 188/344, 347, 196 M, 24.11, 24.22, 188/24.14, 24.15, 24.21
See application file for complete search history.

(56) References Cited

U.S. PATENT DOCUMENTS

| 2001/0003927 A1* | 6/2001 | Hatakoshi | B62L 3/02 74/502.2 |
| 2007/0107995 A1* | 5/2007 | Jen | B62K 23/06 188/67 |
| 2007/0215417 A1* | 9/2007 | Chen | B62L 3/023 188/24.22 |

(Continued)

FOREIGN PATENT DOCUMENTS

| CN | 102862641 B | 9/2014 |
| GB | 1536353 | 12/1978 |

*Primary Examiner* — Robert A. Siconolfi
*Assistant Examiner* — San M Aung
(74) *Attorney, Agent, or Firm* — Mori & Ward, LLP

(57) ABSTRACT

A hydraulic operating device for a small vehicle including a bicycle comprises a base member, a mounting structure, an operating member, and a piston. The base member includes a cylinder bore having a cylinder axis. The mounting structure defines a mounting axis linearly extending along the handlebar in a mounting state where the base member is mounted on a handlebar with the mounting structure. The operating member is pivotally coupled to the base member about a first pivot axis between a rest position and an operated position. The cylinder axis is non-perpendicular to the mounting axis as viewed along the first pivot axis in the mounting state. The piston is movably provided in the cylinder bore. The piston is coupled to the operating member to be pulled in response to a pivotal movement of the operating member from the rest position to the operated position.

21 Claims, 6 Drawing Sheets

(56) References Cited

U.S. PATENT DOCUMENTS

| | | | |
|---|---|---|---|
| 2010/0064838 A1* | 3/2010 | Siew | B60T 11/22 |
| | | | 74/491 |
| 2012/0255390 A1* | 10/2012 | Warren | B62K 15/00 |
| | | | 74/522 |
| 2013/0008751 A1 | 1/2013 | Dunlap, III | |
| 2013/0025988 A1* | 1/2013 | Moore | B62K 23/06 |
| | | | 188/344 |
| 2015/0321725 A1* | 11/2015 | Kariyama | B62K 23/06 |
| | | | 74/491 |
| 2016/0264213 A1* | 9/2016 | Swanson | B62M 25/08 |

* cited by examiner

HYDRAULIC OPERATING DEVICE

BACKGROUND OF THE INVENTION

Field of the Invention

The present invention relates to a hydraulic operating device for a small vehicle including a bicycle. More specifically, the present invention relates to a bicycle hydraulic operating device that is mounted to a bicycle handlebar.

Discussion of the Background

Small vehicles, in particular bicycles are becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is an operating device.

SUMMARY OF THE INVENTION

In accordance with a first aspect of the present invention, a hydraulic operating device for a small vehicle including a bicycle comprises a base member, a mounting structure, an operating member, and a piston. The base member includes a cylinder bore having a cylinder axis. The mounting structure is to mount the base member on a handlebar. The mounting structure defines a mounting axis linearly extending along the handlebar in a mounting state where the base member is mounted on the handlebar with the mounting structure. The operating member is pivotally coupled to the base member about a first pivot axis between a rest position and an operated position. The cylinder axis is non-perpendicular to the mounting axis as viewed along the first pivot axis in the mounting state. The piston is movably provided in the cylinder bore. The piston is coupled to the operating member to be pulled in response to a pivotal movement of the operating member from the rest position to the operated position.

With the hydraulic operating device according to the first aspect, it is possible to arrange the operating member at a position close to the handlebar, improving operability of the hydraulic operating device.

In accordance with a second aspect of the present invention, a hydraulic operating device for a small vehicle including a bicycle comprises a base member, a mounting structure, an operating member, and a piston. The base member includes a cylinder bore having a cylinder axis. The mounting structure is to mount the base member on a handlebar. The mounting structure defines a mounting axis linearly extending along the handlebar in a mounting state where the base member is mounted on the handlebar with the mounting structure. The operating member is pivotally coupled to the base member about a first pivot axis. The first pivot axis is provided between the cylinder axis and the mounting axis as viewed along the first pivot axis in the mounting state. The piston is movably provided in the cylinder bore. The piston is coupled to the operating member to move relative to the base member in response to a pivotal movement of the operating member.

With the hydraulic operating device according to the second aspect, it is possible to arrange the operating member at a position close to the handlebar, improving operability of the hydraulic operating device.

In accordance with a third aspect of the present invention, a hydraulic operating device for a small vehicle including a bicycle comprises a base member, a mounting structure, an operating member, a piston, and a link structure. The base member includes a cylinder bore having a cylinder axis. The mounting structure is to mount the base member to a handlebar, the mounting structure defining a mounting axis extending along the handlebar in a mounting state where the base member is mounted on the handlebar with the mounting structure. The operating member is pivotally coupled to the base member about a first pivot axis between a rest position and an operated position. The piston is movably provided in the cylinder bore. The piston is coupled to the operating member to be pulled in response to a pivotal movement of the operating member from the rest position to the operated position. The link structure couples the operating member to one of the base member and the piston.

With the hydraulic operating device according to the third aspect, it is possible to arrange the operating member at a position close to the handlebar, improving operability of the hydraulic operating device.

In accordance with a fourth aspect of the present invention, the hydraulic operating device according to the first or third aspect is configured so that the mounting structure includes a clamp having a clamp center axis as the mounting axis. The first pivot axis is provided between the cylinder axis and the clamp center axis when viewed along the first pivot axis.

With the hydraulic operating device according to the fourth aspect, it is possible to effectively arrange the operating member at a position closer to the handlebar, improving operability of the bicycle operating device.

In accordance with a fifth aspect of the present invention, the hydraulic operating device according to the first or second aspect further comprises a link structure coupling the operating member to one of the base member and the piston.

With the hydraulic operating device according to the fifth aspect, it is possible to improve flexibility of arrangement of at least one of the base member and the operating member.

In accordance with a sixth aspect of the present invention, the hydraulic operating device according to the third or fifth aspect is configured so that the link structure includes a link coupling the operating member to the piston to transmit an operating force from the operating member to the piston. The link is a separate member from the base member, the piston, and the operating member.

With the hydraulic operating device according to the sixth aspect, it is possible to further improve flexibility of arrangement of at least one of the base member and the operating member.

In accordance with a seventh aspect of the present invention, the hydraulic operating device according to the sixth aspect is configured so that the link is pivotally coupled to the operating member about a second pivot axis spaced apart from the first pivot axis. The link is pivotally coupled to the piston about a third pivot axis spaced apart from the first pivot axis and the second pivot axis.

With the hydraulic operating device according to the seventh aspect, it is possible to further improve flexibility of arrangement of at least one of the base member and the operating member.

In accordance with an eighth aspect of the present invention, the hydraulic operating device according to the seventh aspect is configured so that the operating member includes a first part, a second part, a biasing member, and an adjustment member. The first part is pivotally coupled to the base member about the first pivot axis. The second part is pivotally coupled to the first part about the first pivot axis. The biasing member biases the first part and the second part relative to one another. The adjustment member is provided on one of the first part and the second part so as to change a relative position between the first part and the second part.

With the hydraulic operating device according to the eighth aspect, it is possible to further improve flexibility of arrangement of at least one of the base member and the operating member.

In accordance with a ninth aspect of the present invention, the hydraulic operating device according to the third or fifth aspect is configured so that the link structure includes a link coupling the operating member to the base member to pivotally support the operating member with respect to the base member. The link is a separate member from the base member, the piston, and the operating member.

With the hydraulic operating device according to the ninth aspect, it is possible to further improve flexibility of arrangement of at least one of the base member and the operating member.

In accordance with a tenth aspect of the present invention, the hydraulic operating device according to the ninth aspect is configured so that the link is pivotally coupled to the base member about the first pivot axis. The link is pivotally coupled to the operating member about a second pivot axis spaced apart from the first pivot axis. The operating member is pivotally coupled to the piston about a third pivot axis spaced apart from the first pivot axis and the second pivot axis.

With the hydraulic operating device according to the tenth aspect, it is possible to further improve flexibility of arrangement of at least one of the base member and the operating member.

In accordance with an eleventh aspect of the present invention, the hydraulic operating device according to the tenth aspect is configured so that the operating member includes a first part, a second part, a biasing member, and an adjustment member. The first part is pivotally coupled to the second part about the second pivot axis. The second part is pivotally coupled to the piston about the third pivot axis. The biasing member biases the first part and the second part relative to one another. The adjustment member is provided on one of the first part and the second part so as to change a relative position between the first part and the second part.

With the hydraulic operating device according to the eleventh aspect, it is possible to further improve flexibility of arrangement of at least one of the base member and the operating member.

In accordance with a twelfth aspect of the present invention, the hydraulic operating device according to any one of the first to eleventh aspects is configured so that the piston includes a receiving portion to receive an operating force from the operating member.

With the hydraulic operating device according to the twelfth aspect, it is possible to effectively transmit the operating force to the piston.

In accordance with a thirteenth aspect of the present invention, the hydraulic operating device according to the twelfth aspect is configured so that the operating member includes a transmitting portion to transmit the operating force to the receiving portion.

With the hydraulic operating device according to the thirteenth aspect, it is possible to more effectively transmit the operating force to the piston.

In accordance with a fourteenth aspect of the present invention, the hydraulic operating device according to the thirteenth aspect is configured so that the first pivot axis is provided between the mounting axis and at least one of the receiving portion and the transmitting portion as viewed along the first pivot axis in the mounting state.

With the hydraulic operating device according to the fourteenth aspect, it is possible to change a ratio between a movement amount of the operating member and a movement amount of the piston.

In accordance with a fifteenth aspect of the present invention, the hydraulic operating device according to any one of the twelfth to fourteenth aspects is configured so that the receiving portion is provided outside the cylinder bore.

With the hydraulic operating device according to the fifteenth aspect, it is possible to further improve flexibility of arrangement of the operating member.

In accordance with a sixteenth aspect of the present invention, the hydraulic operating device according to the first or second aspect is configured so that the operating member is slidably coupled to the piston.

With the hydraulic operating device according to the sixteenth aspect, it is possible to change a ratio between a movement amount of the operating member and a movement amount of the piston.

In accordance with a seventeenth aspect of the present invention, the hydraulic operating device according to any one of the first to sixteenth aspects further comprises a hydraulic reservoir connected to the cylinder bore.

With the hydraulic operating device according to the seventeenth aspect, it is possible to absorb a change regarding an amount of a hydraulic fluid in a hydraulic route between the cylinder bore and a bicycle hydraulic operated device.

In accordance with an eighteenth aspect of the present invention, the hydraulic operating device according to any one of the first to seventeenth aspects further comprises a piston adjustment structure to change an initial position of the piston relative to the base member.

With the hydraulic operating device according to the eighteenth aspect, it is possible to adjust the initial position of the piston in accordance with usage conditions of the hydraulic operating device.

In accordance with a nineteenth aspect of the present invention, the hydraulic operating device according to any one of the first to eighteenth aspects further comprises an operating-member adjustment structure to change a rest position of the operating member relative to the base member.

With the hydraulic operating device according to the nineteenth aspect, it is possible to adjust the rest position of the operating member in accordance with usage conditions of the hydraulic operating device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
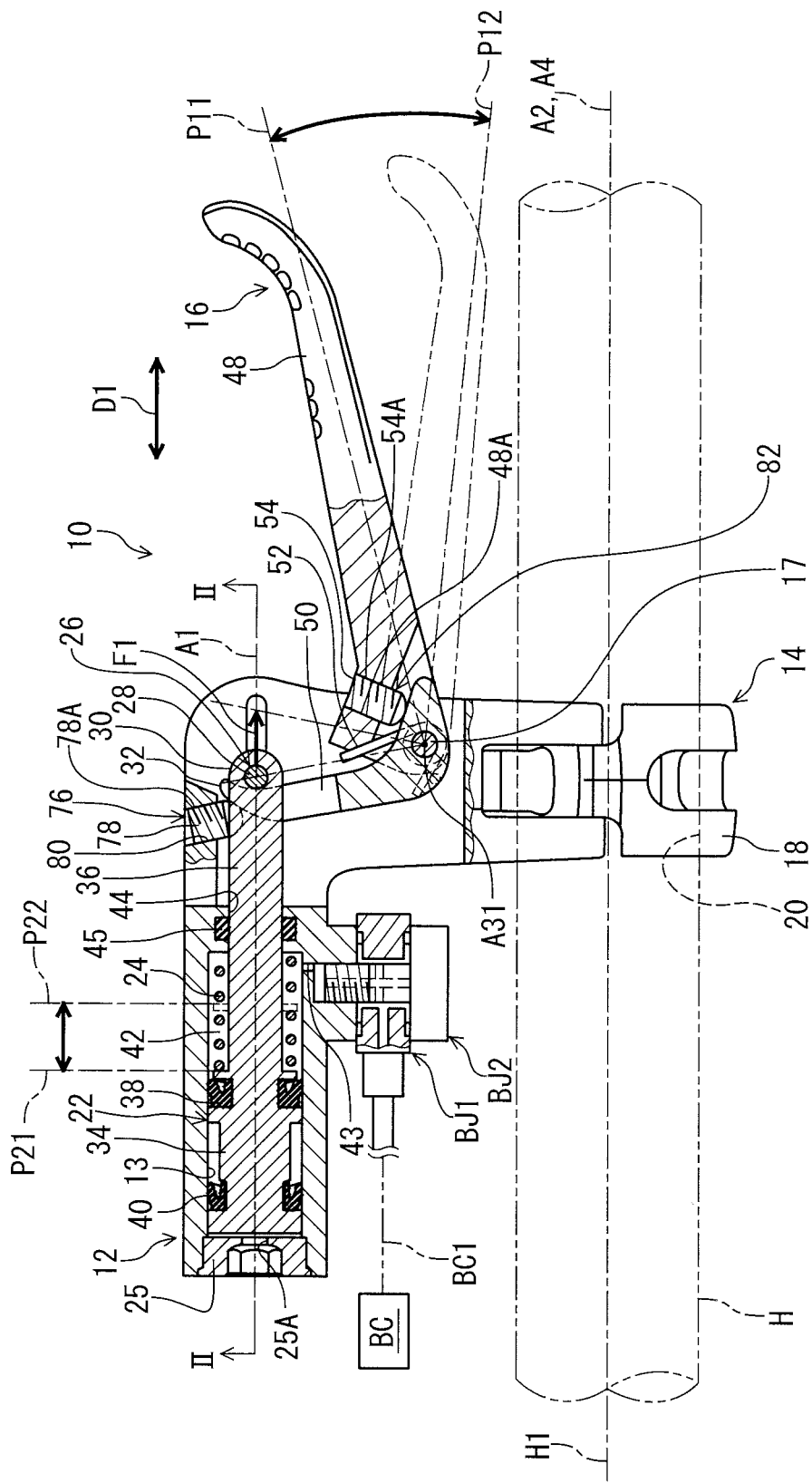
FIG. 1 is a cross-sectional view of a hydraulic operating device in accordance with a first embodiment.

The embodiment(s) will now be described with reference to the accompanying drawings, wherein like reference numerals designate corresponding or identical elements throughout the various drawings.

First Embodiment

Referring initially to FIG. 1, a hydraulic operating device 10 for a small vehicle including a bicycle, in accordance with a first embodiment is illustrated. Small vehicles as used herein refers to electric and non-electric vehicles regardless of the number of their wheels, but does not include four wheeled vehicles having an internal combustion engine as a power source for driving the wheels, or four wheeled electric vehicles that require a license to operate on public roads. The hydraulic operating device 10 is configured to operate a hydraulic operated component BC such as a hydraulic brake. The hydraulic operating device 10 is operatively connected to the hydraulic operated component BC with a hydraulic hose BC1.

The hydraulic operating device 10 comprises a base member 12 and a mounting structure 14. The base member 12 includes a cylinder bore 13 having a cylinder axis A1. The mounting structure 14 is to mount the base member 12 on a handlebar H. In this embodiment, the handlebar H is a bicycle handlebar. Thus, the hydraulic operating device 10 can be referred as a bicycle hydraulic operating device. More specifically, the hydraulic operating device 10 can be referred as a bicycle hydraulic brake operating device. The mounting structure 14 defines a mounting axis A2 extending along the handlebar H in a mounting state where the base member 12 is mounted on the handlebar H with the mounting structure 14. In this embodiment, the mounting structure 14 defines the mounting axis A2 linearly extending along the handlebar H in the mounting state where the base member 12 is mounted on the handlebar H with the mounting structure 14. The hydraulic operating device 10 is a right-hand control device. However, the hydraulic operating device 10 can be a left-hand control device.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on a saddle (not shown) of a bicycle with facing the handlebar H. Accordingly, these terms, as utilized to describe the hydraulic operating device 10, should be interpreted relative to the bicycle equipped with the hydraulic operating device 10 as used in an upright riding position on a horizontal surface.

The hydraulic operating device 10 comprises an operating member 16. The operating member 16 is pivotally coupled to the base member 12 about a first pivot axis A31. The operating member 16 is pivotally coupled to the base member 12 about the first pivot axis A31 between a rest position P11 and an operated position P12.

In the present application, the term "rest position" as used herein refers to a position at which a movable part such as the operating member 16 remains stationary in a state where the movable part is not operated by the user. The term "operated position" as used herein refers to a position at which the movable part has been operated by the user to perform the operation of the bicycle component.

The hydraulic operating device 10 comprises a pivot shaft 17. The pivot shaft 17 pivotally couples the operating member 16 to the base member 12. The pivot shaft 17 defines the first pivot axis A31.

The cylinder axis A1 is non-perpendicular to the mounting axis A2 as viewed along the first pivot axis A31 in the mounting state. The cylinder axis A1 extends along the mounting axis A2 as viewed along the first pivot axis A31 in the mounting state. In this embodiment, the cylinder axis A1 is substantially parallel to the mounting axis A2 as viewed along the first pivot axis A31 in the mounting state. The cylinder bore 13 extends along the cylinder axis A1.

In this embodiment, the first pivot axis A31 is provided between the cylinder axis A1 and the mounting axis A2 as viewed along the first pivot axis A31 in the mounting state. The mounting structure 14 includes a clamp 18 having a clamp center axis A4 as the mounting axis A2. The first pivot axis A31 is provided between the cylinder axis A1 and the clamp center axis A4 when viewed along the first pivot axis A31. However, the first pivot axis A31 can be provided at other positions.

The clamp 18 includes a clamp opening 20. The clamp center axis A4 is a center axis of the clamp opening 20. The handlebar H extends through the clamp opening 20 in the mounting state. The clamp center axis A4 (the mounting axis A2) substantially coincides with a longitudinal center axis H1 of the handlebar H in the mounting state. The handlebar H is a flat bar, and the longitudinal center axis H1 linearly extends. The mounting structure 14 can include other structures instead of or in addition to the clamp 18.

The hydraulic operating device 10 comprises a piston 22 movably provided in the cylinder bore 13. The piston 22 is coupled to the operating member 16 to move relative to the base member 12 in response to a pivotal movement of the operating member 16. The piston 22 is coupled to the operating member 16 to be pulled in response to a pivotal movement of the operating member 16 from the rest position P11 to the operated position P12.

The piston 22 is moved relative to the base member 12 toward the operating member 16 in response to the pivotal movement of the operating member 16 from the rest position P11 to the operated position P12. The piston 22 is movable relative to the base member 12 from an initial position P21 to an actuated position P22. The piston 22 is moved relative to the base member 12 from the initial position P21 to the actuated position P22 in response to the pivotal movement of the operating member 16 from the rest position P11 to the operated position P12.

The hydraulic operating device 10 includes a piston biasing member 24 and an end plug 25. The piston biasing member 24 is provided in the cylinder bore 13 to bias the piston 22 toward the initial position P21. For example, the piston biasing member 24 includes a coiled spring. The end plug 25 is secured to the base member 12 to close an end of the cylinder bore 13. The end plug 25 has an air vent hole 25A to allow the piston 22 to move in the cylinder bore 13.

The hydraulic operating device 10 comprises a link structure 26 coupling the operating member 16 to one of the base member 12 and the piston 22. In this embodiment, the link structure 26 includes a link pin 28. However, the link structure 26 can include another member instead of or in addition to the link pin 28.

The operating member 16 is slidably coupled to the piston 22. The piston 22 includes a receiving portion 30 to receive an operating force F1 from the operating member 16. The operating member 16 includes a transmitting portion 32 to transmit the operating force F1 to the receiving portion 30.

The piston 22 includes a piston body 34, a piston rod 36, a first seal ring 38, and a second seal ring 40. The piston body 34 is movably provided in the cylinder bore 13. The first seal ring 38 and the second seal ring 40 are attached to the piston body 34. The cylinder bore 13, the piston body 34, and the first seal ring 38 define a hydraulic chamber 42. A banjo BJ1 is attached to the base member 12 with a banjo attachment bolt BJ2. The banjo BJ1 is provided at an end of the hydraulic hose BC1. The hydraulic chamber 42 is connected to the hydraulic operated component BC with a hole 43, the banjo BJ1, the banjo attachment bolt BJ2 and the hydraulic hose BC1.

The piston rod 36 extends from the piston body 34 along the cylinder axis A1. The base member 12 includes a guide hole 44 extending from the cylinder bore 13. The piston rod 36 extends through the guide hole 44. The hydraulic operating device 10 comprises a rod seal ring 45 provided in the guide hole 44.

In this embodiment, the receiving portion 30 is provided at an end of the piston rod 36. The receiving portion 30 is provided outside the cylinder bore 13. The receiving portion 30 includes a coupling hole 46. The link pin 28 extends through the coupling hole 46.

The operating member 16 includes a first part 48, a second part 50, a biasing member 52, and an adjustment member 54. The first part 48 is pivotally coupled to the base member 12 about the first pivot axis A31. The first part 48 is configured to be operated by the rider directly. The first part 48 extends from the first pivot axis A31. The first part 48 defines the rest position P11 and the operated position P12 of the operating member 16.

The second part 50 is pivotally coupled to the first part 48 and the base member 12 about the first pivot axis A31. The second part 50 is a separate member from the first part 48 and extends from the first pivot axis A31 toward the piston 22. The transmitting portion 32 is provided on the second part 50. The biasing member 52 biases the first part 48 and the second part 50 to pivot relative to one another about the first pivot axis A31. In this embodiment, the biasing member 52 includes a coiled spring and is mounted on the pivot shaft 17. The adjustment member 54 is provided on one of the first part 48 and the second part 50 so as to change a relative position between the first part 48 and the second part 50. In this embodiment, the adjustment member 54 is provided on the first part 48 so as to change the relative position between the first part 48 and the second part 50. However, the adjustment member 54 can be provided on the second part 50 so as to change a relative position between the first part 48 and the second part 50. The first part 48 includes an adjustment threaded hole 48A. The adjustment member 54 includes an external thread 54A threadedly engaged in the adjustment threaded hole 48A.

The first pivot axis A31 is provided between the mounting axis A2 and at least one of the receiving portion 30 and the transmitting portion 32 as viewed along the first pivot axis A31 in the mounting state. In this embodiment, the first pivot axis A31 is provided between the mounting axis A2 and the receiving portion 30 and between the mounting axis A2 and the transmitting portion 32 as viewed along the first pivot axis A31 in the mounting state. However, the first pivot axis A31 can be provided only between the mounting axis A2 and the receiving portion 30 or only between the mounting axis A2 and the transmitting portion 32 as viewed along the first pivot axis A31 in the mounting state.

Figure 2:
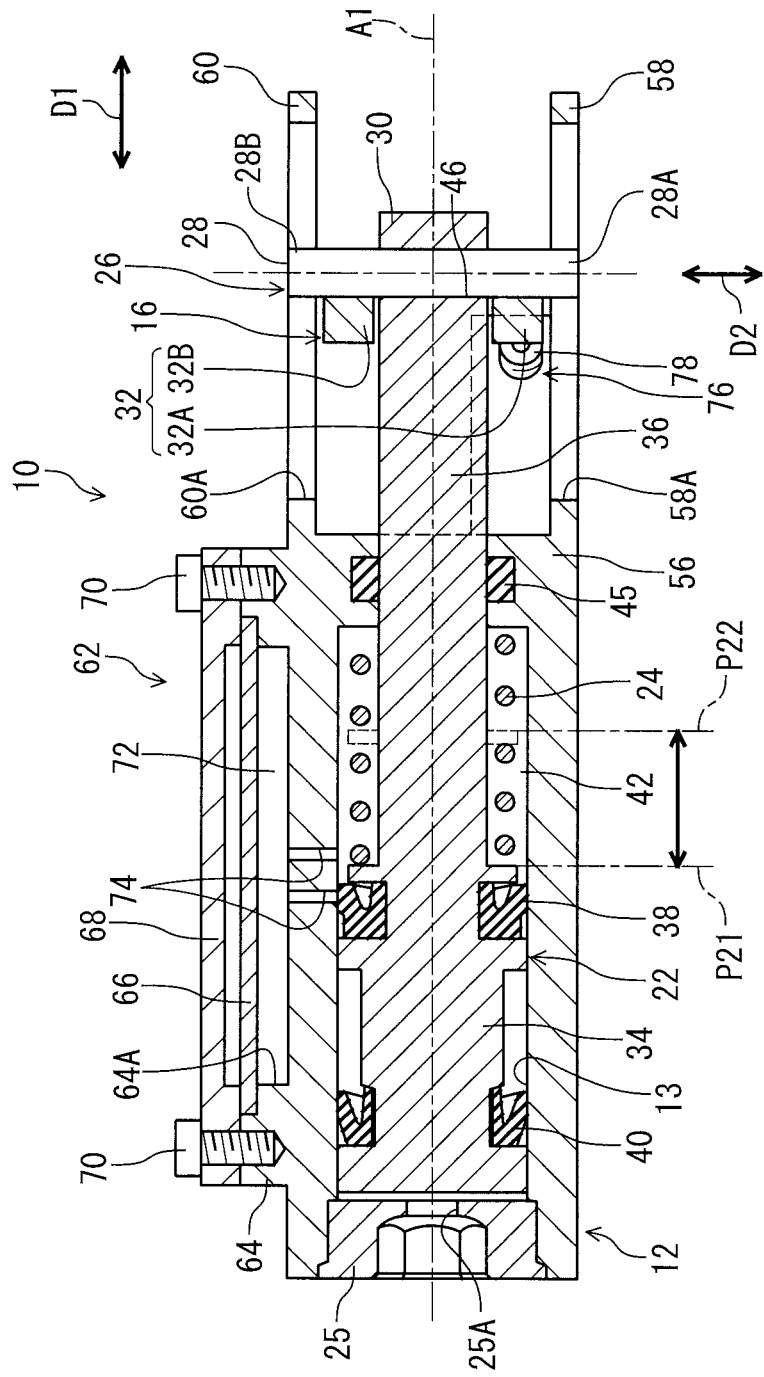
FIG. 2 is a cross-sectional view of the hydraulic operating device taken along line II-II of FIG. 1.

As seen in FIG. 2, the base member 12 includes a base body 56, a first wall 58, and a second wall 60. The cylinder bore 13 is provided in the base body 56. The first wall 58 and the second wall 60 extend from the base body 56 in a first axial direction D1 of the cylinder axis A1. The first wall 58 and the second wall 60 are spaced apart from each other in a second axial direction D2 of the first pivot axis A31. The operating member 16 is provided between the first wall 58 and the second wall 60 in the second axial direction D2.

The first wall 58 includes a first guide groove 58A extending in the first axial direction D1. The second wall 60 includes a second guide groove 60A extending in the first axial direction D1. A first end 28A of the link pin 28 is movably provided in the first guide groove 58A. A second end 28B of the link pin 28 is movably provided in the second guide groove 60A.

The transmitting portion 32 includes a first transmitting part 32A and a second transmitting part 32B. The first transmitting part 32A is in contact with the link pin 28. The second transmitting part 32B is in contact with the link pin 28. The piston rod 36 is provided between the first transmitting part 32A and the second transmitting part 32B in the second axial direction D2.

As seen in FIG. 2, the hydraulic operating device 10 further comprises a hydraulic reservoir 62 connected to the cylinder bore 13. The hydraulic reservoir 62 includes a reservoir tank 64, a diaphragm 66, and a lid 68. The reservoir tank 64 is provided on the base member 12 and includes a reservoir recess 64A. The diaphragm 66 is attached to the reservoir tank 64. The lid 68 is secured to the reservoir tank 64 with screws 70. The reservoir tank 64 and the diaphragm 66 define a reservoir chamber 72. The hydraulic chamber 42 and the reservoir chamber 72 are filled with a fluid such as a mineral oil. The reservoir chamber 72 is connected to the cylinder bore 13 via connection ports 74 in an initial state where the piston 22 is in the initial position P21. In more detail, at least one of the connection ports 74 connects the reservoir chamber 72 to the hydraulic chamber 42 in the initial state.

As seen in FIG. 1, the hydraulic operating device 10 further comprises a piston adjustment structure 76 to change the initial position P21 of the piston 22 relative to the base member 12. The piston adjustment structure 76 includes a piston adjustment member 78 rotatably attached to the base member 12. The base member 12 includes a piston-adjustment threaded hole 80. The piston adjustment member 78 includes an external thread 78A threadedly engaged in the piston-adjustment threaded hole 80. The piston adjustment member 78 is in contact with the transmitting portion 32. The transmitting portion 32 is pressed against the piston adjustment member 78 by the piston biasing member 24. Thus, the piston adjustment structure 76 positions the piston 22 in the initial position P21. The piston adjustment structure 76 also positions the operating member 16 in the rest position P11. Rotation of the piston adjustment member 78 pivots the transmitting portion 32 relative to the base member 12 about the first pivot axis A31. This changes the initial position P21 of the piston 22 relative to the base member 12 and also changes the rest position P11 of the operating member 16 relative to the base member 12. The piston adjustment member 78 can be provided to press the piston 22 directly.

The hydraulic operating device 10 further comprises an operating-member adjustment structure 82 to change the rest position P11 of the operating member 16 relative to the base member 12. The operating-member adjustment structure 82 includes the adjustment member 54 of the operating member 16. The adjustment member 54 is rotatably attached to the first part 48 of the operating member 16. The adjustment member 54 is in contact with the second part 50. The adjustment member 54 is pressed against the transmitting portion 32 by the biasing member 52. Rotation of the adjustment member 54 pivots the first part 48 relative to the second part 50 about the first pivot axis A31. This changes the rest position P11 of the operating member 16 relative to the base member 12.

Second Embodiment

A hydraulic operating device 210 in accordance with a second embodiment will be described below referring to FIGS. 3 and 4. The hydraulic operating device 210 has the same structure and/or configuration as those of the hydraulic operating device 10 except for the link structure 26. Thus, elements having substantially the same function as those in the first embodiment will be numbered the same here, and will not be described and/or illustrated again in detail here for the sake of brevity.

Figure 3:
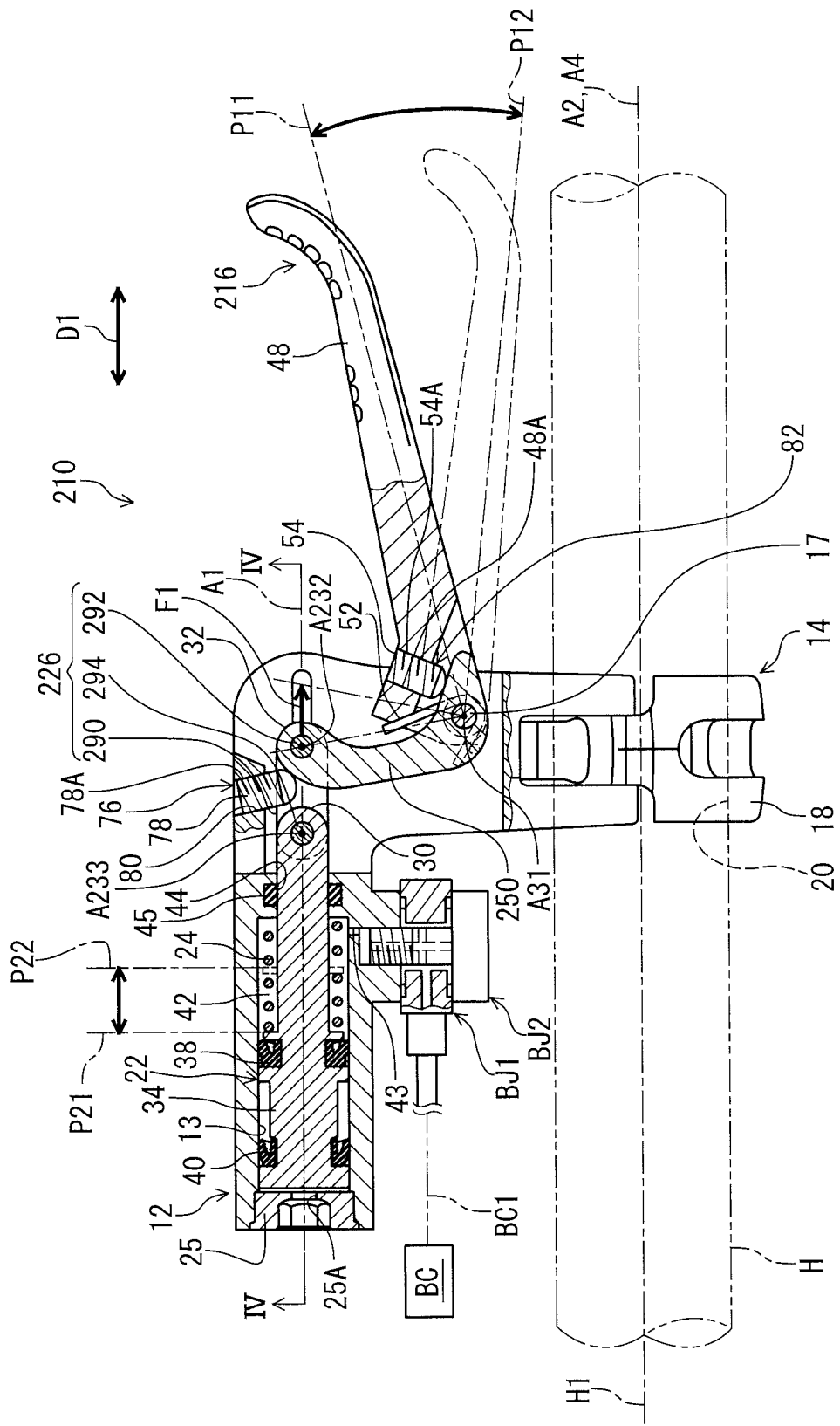
FIG. 3 is a cross-sectional view of a hydraulic operating device in accordance with a second embodiment.

As seen in FIG. 3, the hydraulic operating device 210 comprises the base member 12, the mounting structure 14, and an operating member 216. The hydraulic operating device 210 comprises a link structure 226 coupling the operating member 216 to one of the base member 12 and the piston 22. In this embodiment, the link structure 226 couples the operating member 216 to the piston 22.

The link structure 226 includes a link 290. The link 290 couples the operating member 216 to the piston 22 to transmit the operating force F1 from the operating member 216 to the piston 22. The link 290 is a separate member from the base member 12, the piston 22, and the operating member 216.

The link 290 is pivotally coupled to the operating member 216 about a second pivot axis A232 spaced apart from the first pivot axis A31. The link 290 is pivotally coupled to the piston 22 about a third pivot axis A233 spaced apart from the first pivot axis A31 and the second pivot axis A232. The link structure 226 includes a link pin 292 and an additional link pin 294. The link 290 is pivotally coupled to the operating member 216 about the second pivot axis A232 with the link pin 292. The link 290 is pivotally coupled to the piston 22 about the third pivot axis A233 with the additional link pin 294. The additional link pin 294 defines the third pivot axis A233. The link pin 292 defines the second pivot axis A232.

The operating member 216 includes the first part 48, a second part 250, the biasing member 52, and the adjustment member 54. The first part 48, the second part 250, the biasing member 52, and the adjustment member 54 includes substantially the same structures as those of the first part 48, the second part 50, the biasing member 52, and the adjustment member 54 of the first embodiment. The first part 48 is pivotally coupled to the base member 12 about the first pivot axis A31. The second part 250 is pivotally coupled to the first part 48 about the first pivot axis A31. The second part 250 is pivotally coupled to the link 290 about the second pivot axis A232 with the link pin 292. The biasing member 52 biases the first part 48 and the second part 250 relative to one another. The adjustment member 54 is provided on one of the first part 48 and the second part 250 so as to change a relative position between the first part 48 and the second part 250. In this embodiment, the adjustment member 54 is provided on the first part 48 so as to change the relative position between the first part 48 and the second part 250. However, the adjustment member 54 can be provided on the second part 250 so as to change the relative position between the first part 48 and the second part 250.

The piston 22 includes the receiving portion 30 to receive the operating force F1 from the operating member 216. The operating member 216 includes the transmitting portion 32 to transmit the operating force F1 to the receiving portion 30. In this embodiment, the transmitting portion 32 is provided on the second part 250 of the operating member 216.

Figure 4:
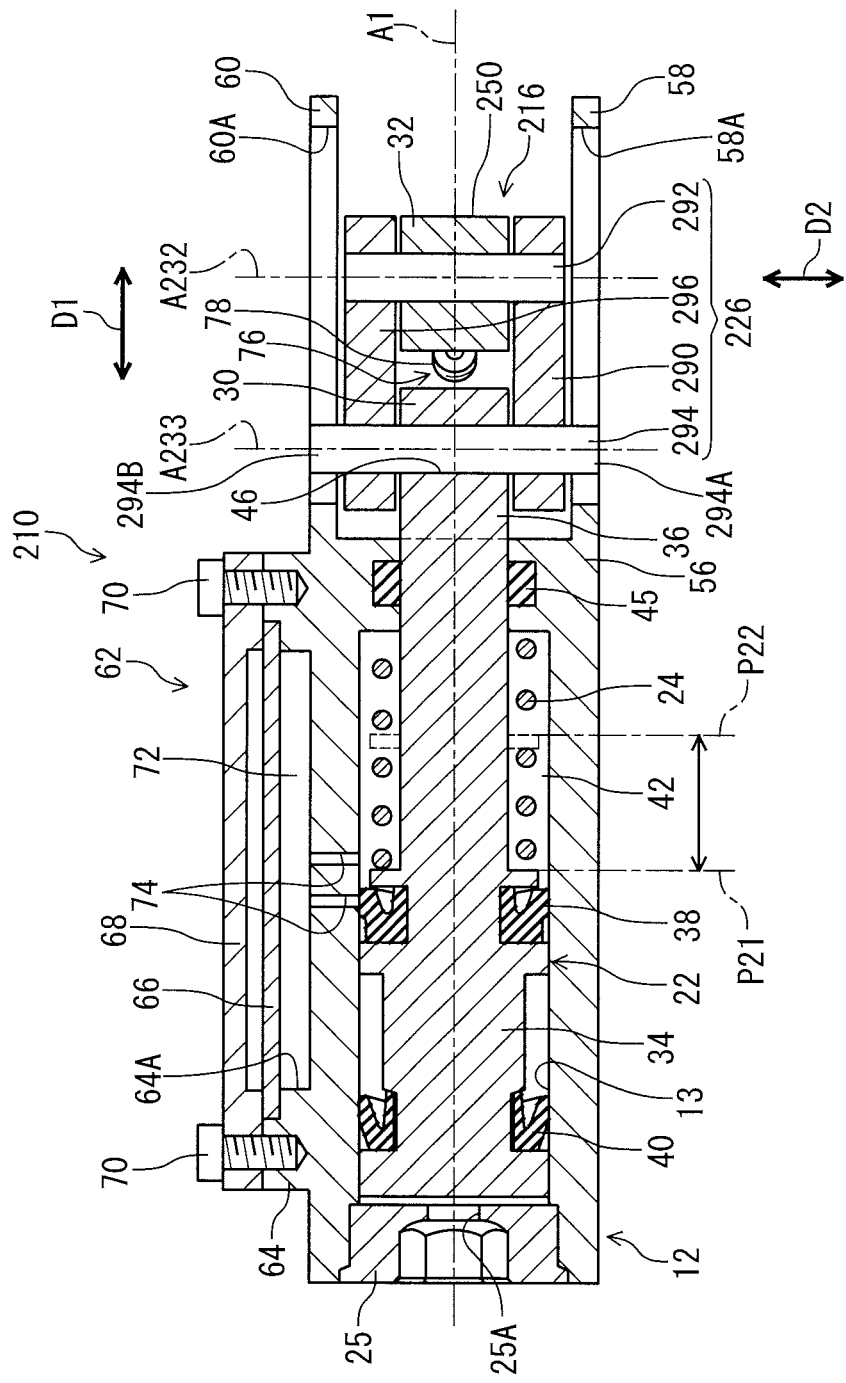
FIG. 4 is a cross-sectional view of the hydraulic operating device taken along line IV-IV of FIG. 3.

As seen in FIG. 4, the link structure 226 includes an additional link 296. The additional link 296 couples the operating member 216 to the piston 22 to transmit the operating force F1 from the operating member 216 to the piston 22. The additional link 296 is a separate member from the base member 12, the piston 22, and the operating member 216. The link 290 is provided between the piston 22 and the first wall 58 in the second axial direction D2. The additional link 296 is provided between the piston 22 and the second wall 60 in the second axial direction D2. A first end 294A of the additional link pin 294 is movably provided in the first guide groove 58A. A second end 294B of the additional link pin 294 is movably provided in the second guide groove 60A. The link pin 292 is not provided in the first guide groove 58A and the second guide groove 60A.

Third Embodiment

A hydraulic operating device 310 in accordance with a third embodiment will be described below referring to FIGS. 5 and 6. The hydraulic operating device 310 has the same structure and/or configuration as those of the hydraulic operating device 10 except for the link structure 26. Thus, elements having substantially the same function as those in the above embodiments will be numbered the same here, and will not be described and/or illustrated again in detail here for the sake of brevity.

Figure 5:
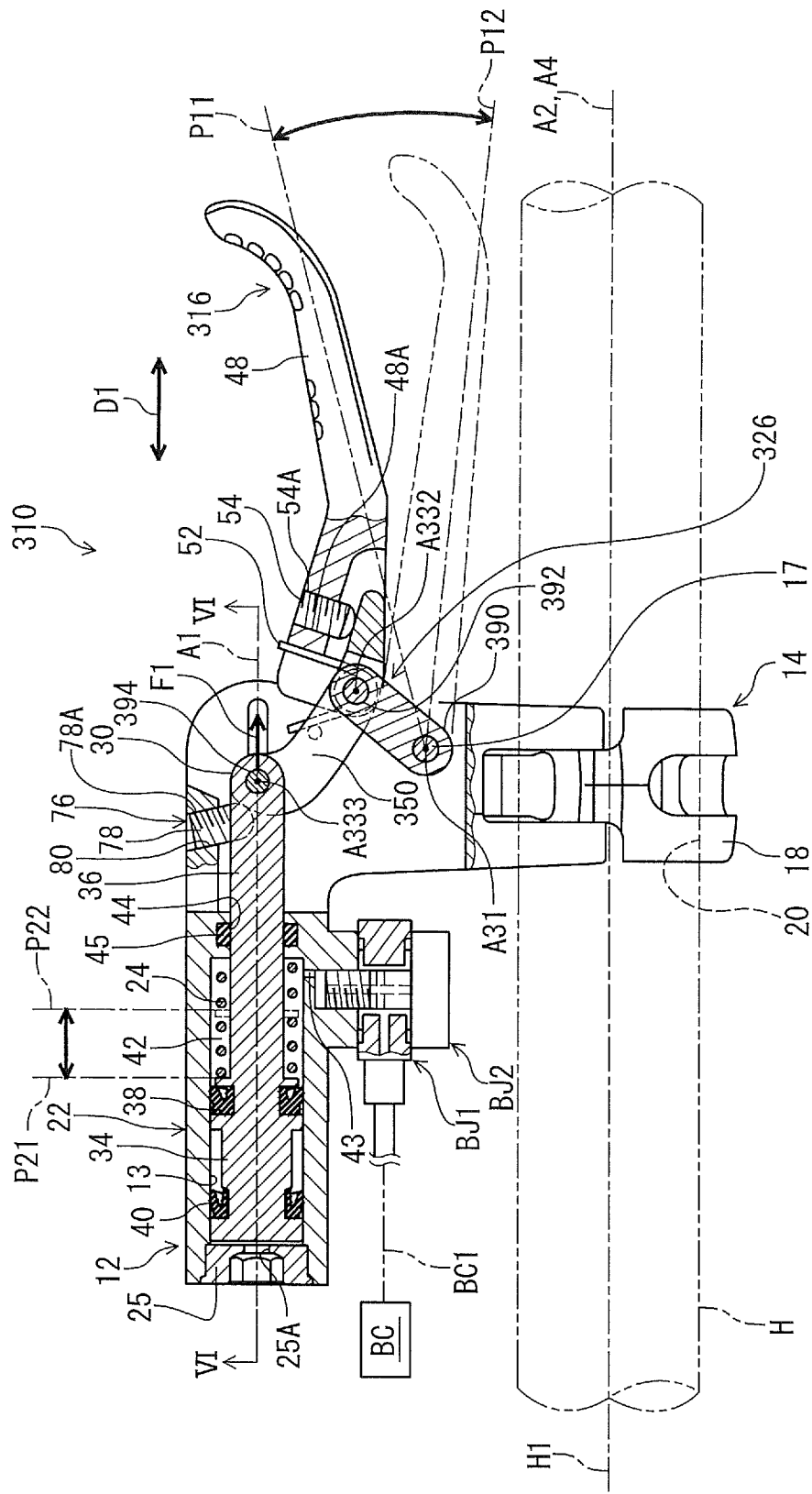
FIG. 5 is a cross-sectional view of a hydraulic operating device in accordance with a third embodiment.

As seen in FIG. 5, the hydraulic operating device 310 comprises the base member 12, the mounting structure 14, and an operating member 316. The hydraulic operating device 310 comprises a link structure 326 coupling the operating member 316 to one of the base member 12 and the piston 22. In this embodiment, the link structure 326 couples the operating member 316 to the base member 12.

The link structure 326 includes a link 390. The link 390 couples the operating member 316 to the base member 12 to pivotally support the operating member 316 with respect to the base member 12. The link 390 is a separate member from the base member 12, the piston 22, and the operating member 316.

The link 390 is pivotally coupled to the base member 12 about the first pivot axis A31. The link 390 is pivotally coupled to the operating member 316 about a second pivot axis A332 spaced apart from the first pivot axis A31. The operating member 316 is pivotally coupled to the piston 22 about the third pivot axis A333 spaced apart from the first pivot axis A31 and the second pivot axis A332.

The link 390 is pivotally coupled to the base member 12 with the pivot shaft 17.

The link structure 326 includes a link pin 392 and an additional link pin 394. The link 390 is pivotally coupled to the operating member 316 about the second pivot axis A332 with the link pin 392. The link 390 is pivotally coupled to the piston 22 about the third pivot axis A333 with the additional link pin 394. The link pin 392 defines the second pivot axis A332. The additional link pin 394 defines the third pivot axis A333.

The operating member 316 includes the first part 48, a second part 350, the biasing member 52, and the adjustment member 54. The first part 48, the second part 350, the biasing member 52, and the adjustment member 54 includes substantially the same structures as those of the first part 48, the second part 50, the biasing member 52, and the adjustment member 54 of the first embodiment. The first part 48 is pivotally coupled to the second part 350 about the second pivot axis A332. The second part 350 is pivotally coupled to the piston 22 about the third pivot axis A333. The first part 48 is pivotally coupled to the second part 350 about the second pivot axis A332 with the link pin 392. The second part 350 is pivotally coupled to the piston 22 about the third pivot axis A333 with the additional link pin 394. The biasing member 52 biases the first part 48 and the second part 350 relative to one another. The adjustment member 54 is provided on one of the first part 48 and the second part 350 so as to change a relative position between the first part 48 and the second part 350. In this embodiment, the adjustment member 54 is provided on the first part 48 so as to change the relative position between the first part 48 and the second part 350. However, the adjustment member 54 can be provided on the second part 350 so as to change the relative position between the first part 48 and the second part 350.

The piston 22 includes the receiving portion 30 to receive the operating force F1 from the operating member 316. The operating member 316 includes the transmitting portion 32 to transmit the operating force F1 to the receiving portion 30. In this embodiment, the transmitting portion 32 is provided on the second part 350 of the operating member 316.

Figure 6:
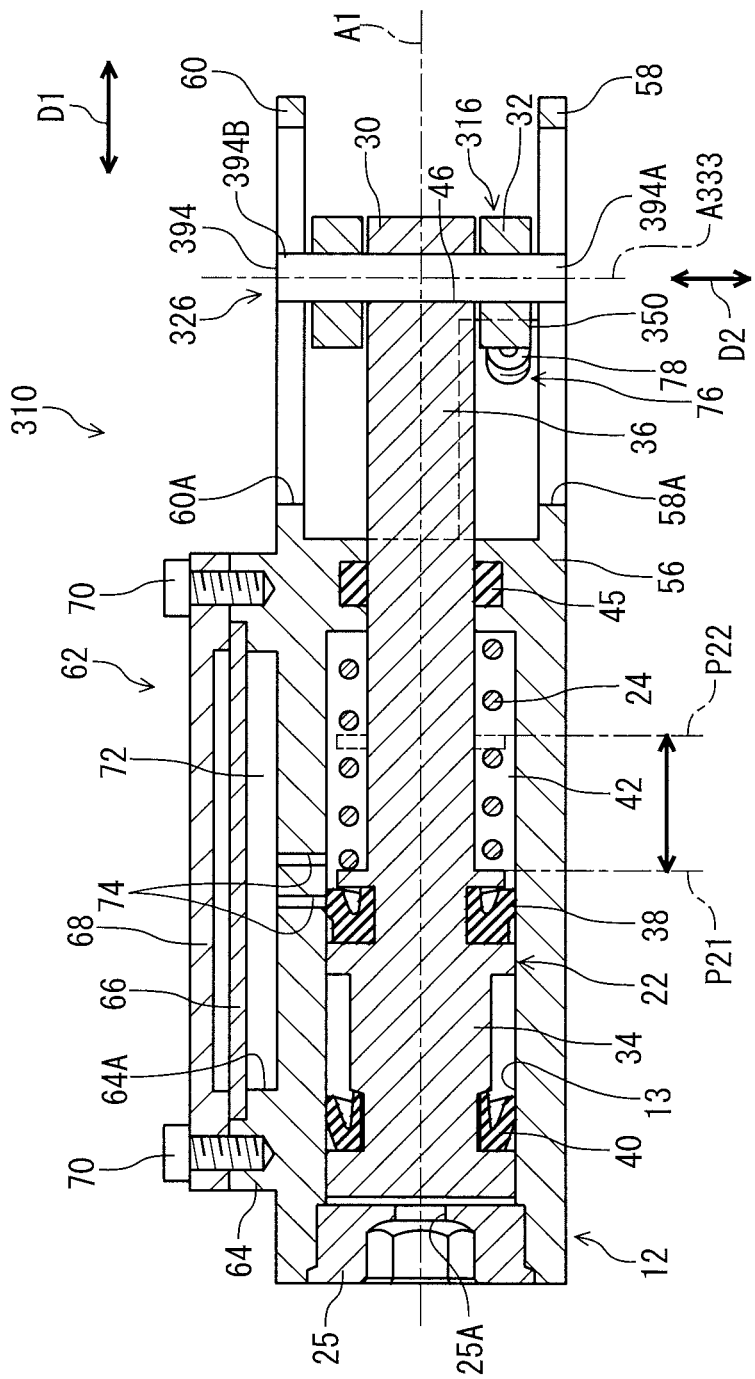
FIG. 6 is a cross-sectional view of the hydraulic operating device taken along line VI-VI of FIG. 5.

As seen in FIG. 6, the second part 350 of the operating member 316 is provided between the first wall 58 and the second wall 60 in the second axial direction D2. A first end 394A of the additional link pin 394 is movably provided in the first guide groove 58A. A second end 394B of the additional link pin 394 is movably provided in the second guide groove 60A.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A hydraulic operating device for a small vehicle including a bicycle, comprising:
    a base member including a cylinder bore having a cylinder axis;
    a mounting structure to mount the base member on a handlebar, the mounting structure defining a mounting axis linearly extending along the handlebar in a mounting state where the base member is mounted on the handlebar with the mounting structure;
    an operating member pivotally coupled to the base member about a first pivot axis between a rest position and an operated position, the cylinder axis being non-perpendicular to the mounting axis as viewed along the first pivot axis in the mounting state;
    a piston movably provided in the cylinder bore, the piston being coupled to the operating member to be pulled in response to a pivotal movement of the operating member from the rest position to the operated position; and
    a hydraulic reservoir connected to the cylinder bore, the hydraulic reservoir being arranged so as to overlap with the cylinder bore as viewed in a direction parallel to the first pivot axis, wherein
    the cylinder bore is offset from the mounting structure along the mounting axis as viewed in a direction perpendicular to the mounting axis.

2. A hydraulic operating device for a small vehicle including a bicycle, comprising:
    a base member including a cylinder bore having a cylinder axis;
    a mounting structure to mount the base member on a handlebar, the mounting structure defining a mounting axis linearly extending along the handlebar in a mounting state where the base member is mounted on the handlebar with the mounting structure;
    an operating member pivotally coupled to the base member about a first pivot axis, the first pivot axis being provided between the cylinder axis and the mounting axis as viewed along the first pivot axis in the mounting state;
    a piston movably provided in the cylinder bore, the piston being coupled to the operating member to move relative to the base member in response to a pivotal movement of the operating member; and
    a hydraulic reservoir connected to the cylinder bore, the hydraulic reservoir being arranged so as to overlap with the cylinder bore as viewed in a direction parallel to the first pivot axis, wherein
    the cylinder bore is offset from the mounting structure along the mounting axis as viewed in a direction perpendicular to the mounting axis.

3. A hydraulic operating device for a small vehicle including a bicycle, comprising:
    a base member including a cylinder bore having a cylinder axis;
    a mounting structure to mount the base member to a handlebar, the mounting structure defining a mounting axis extending along the handlebar in a mounting state where the base member is mounted on the handlebar with the mounting structure;
an operating member pivotally coupled to the base member about a first pivot axis between a rest position and an operated position;
a piston movably provided in the cylinder bore, the piston being coupled to the operating member to be pulled in response to a pivotal movement of the operating member from the rest position to the operated position;
a hydraulic reservoir connected to the cylinder bore, the hydraulic reservoir being arranged so as to overlap with the cylinder bore as viewed in a direction parallel to the first pivot axis; and
a link structure coupling the operating member to one of the base member and the piston, wherein
the cylinder bore is offset from the mounting structure along the mounting axis as viewed in a direction perpendicular to the mounting axis.

4. The hydraulic operating device according to claim 1, wherein
the mounting structure includes a clamp having a clamp center axis as the mounting axis, and
the first pivot axis is provided between the cylinder axis and the clamp center axis when viewed along the first pivot axis.

5. The hydraulic operating device according to claim 1, further comprising
a link structure coupling the operating member to one of the base member and the piston.

6. The hydraulic operating device according to claim 5, wherein
the link structure includes a link coupling the operating member to the piston to transmit an operating force from the operating member to the piston, and
the link is a separate member from the base member, the piston, and the operating member.

7. The hydraulic operating device according to claim 6, wherein
the link is pivotally coupled to the operating member about a second pivot axis spaced apart from the first pivot axis, and
the link is pivotally coupled to the piston about a third pivot axis spaced apart from the first pivot axis and the second pivot axis.

8. The hydraulic operating device according to claim 7, wherein
the operating member includes
a first part pivotally coupled to the base member about the first pivot axis,
a second part pivotally coupled to the first part about the first pivot axis,
a biasing member biasing the first part and the second part relative to one another, and
an adjustment member provided on one of the first part and the second part so as to change a relative position between the first part and the second part.

9. The hydraulic operating device according to claim 5, wherein
the link structure includes a link coupling the operating member to the base member to pivotally support the operating member with respect to the base member, and
the link is a separate member from the base member, the piston, and the operating member.

10. The hydraulic operating device according to claim 9, wherein
the link is pivotally coupled to the base member about the first pivot axis,
the link is pivotally coupled to the operating member about a second pivot axis spaced apart from the first pivot axis, and
the operating member is pivotally coupled to the piston about a third pivot axis spaced apart from the first pivot axis and the second pivot axis.

11. The hydraulic operating device according to claim 10, wherein
the operating member includes
a first part pivotally coupled to the second part about the second pivot axis,
a second part pivotally coupled to the piston about the third pivot axis,
a biasing member biasing the first part and the second part relative to one another, and
an adjustment member provided on one of the first part and the second part so as to change a relative position between the first part and the second part.

12. The hydraulic operating device according to claim 1, wherein
the piston includes a receiving portion to receive an operating force from the operating member.

13. The hydraulic operating device according to claim 12, wherein
the operating member includes a transmitting portion to transmit the operating force to the receiving portion.

14. The hydraulic operating device according to claim 13, wherein
the first pivot axis is provided between the mounting axis and at least one of the receiving portion and the transmitting portion as viewed along the first pivot axis in the mounting state.

15. The hydraulic operating device according to claim 12, wherein
the receiving portion is provided outside the cylinder bore.

16. The hydraulic operating device according to claim 1, wherein
the operating member is slidably coupled to the piston.

17. The hydraulic operating device according to claim 1, further comprising
a piston adjustment structure to change an initial position of the piston relative to the base member.

18. The hydraulic operating device according to claim 1, further comprising
an operating-member adjustment structure to change a rest position of the operating member relative to the base member.

19. The hydraulic operating device according to claim 1, wherein
the piston has a piston rod with a pin provided at an end of the piston rod of the piston, the pin being slidably received within a guide groove extending along the base member.

20. The hydraulic operating device according to claim 2, wherein
the piston has a piston rod with a pin provided at an end of the piston rod of the piston, the pin being slidably received within a guide groove extending along the base member.

21. The hydraulic operating device according to claim 3, wherein
the piston has a piston rod with a pin provided at an end of the piston rod of the piston, the pin being slidably received within a guide groove extending along the base member.

* * * * *